United States Patent
Biswas et al.

(10) Patent No.: US 11,365,506 B2
(45) Date of Patent: Jun. 21, 2022

(54) WASHING MACHINE COMPRISING A WATER PURIFICATION SYSTEM

(71) Applicant: Conopco, Inc., Englewood Cliffs, NJ (US)

(72) Inventors: Sarmistha Biswas, Bangalore (IN); Debosree Chatterjee, Bangalore (IN); Dhanalakshmi Thirumeni, Bangalore (IN)

(73) Assignee: CONOPCO, INC., Englewood Cliffs ( * ) Notice: Subject to any disclaimer, the term of this patent is extended or adjusted under 35 U.S.C. 154(b) by 416 days.

(21) Appl. No.: 16/622,036

(22) PCT Filed: May 7, 2018

(86) PCT No.: PCT/EP2018/061705
§ 371 (c)(1),
(2) Date: Dec. 12, 2019

(87) PCT Pub. No.: WO2018/233919
PCT Pub. Date: Dec. 27, 2018

(65) Prior Publication Data
US 2020/0208331 A1    Jul. 2, 2020

(30) Foreign Application Priority Data

Jun. 19, 2017 (EP) ..................... 17176631

(51) Int. Cl.
*D06F 39/00* (2020.01)
*D06F 33/62* (2020.01)
(Continued)

(52) U.S. Cl.
CPC ........... *D06F 39/006* (2013.01); *B01D 21/01* (2013.01); *B01D 21/28* (2013.01); *B01D 21/30* (2013.01);
(Continued)

(58) Field of Classification Search
CPC ................................................... D06F 39/006
See application file for complete search history.

(56) References Cited

U.S. PATENT DOCUMENTS

| | | | |
|---|---|---|---|
| 10,655,265 B2 | 5/2020 | Xu et al. | |
| 2016/0201249 A1 | 7/2016 | Xu et al. | |

(Continued)

FOREIGN PATENT DOCUMENTS

| | | |
|---|---|---|
| CN | 1331659 A | 1/2002 |
| CN | 103384646 | 11/2013 |

(Continued)

OTHER PUBLICATIONS

Search Report and Written Opinioin in PCTEP2018061705.
Search Report and Written Opinion in EP17176631; dated Dec. 5, 2017.

*Primary Examiner* — Peter Keyworth
(74) *Attorney, Agent, or Firm* — Carter, DeLuca & Farrell LLP; George Likourezos; Bret P. Shapiro

(57) ABSTRACT

The invention relates to a program-controlled apparatus (1) for washing items that is equipped with a water purification system (8) for purifying the wash liquor by removing detergent and suspended soil, which purification system (8) utilizes addition of flocculant, wherein the amount of flocculant that is added is controlled to minimize the total amount of flocculant used without compromising the efficacy of the purification treatment.

8 Claims, 1 Drawing Sheet

(51) Int. Cl.
  *B01D 21/01* (2006.01)
  *B01D 21/28* (2006.01)
  *B01D 21/30* (2006.01)
  *C02F 1/52* (2006.01)
  *D06F 103/18* (2020.01)
  *D06F 105/34* (2020.01)
  *D06F 103/22* (2020.01)
  *D06F 105/06* (2020.01)
  *C02F 103/00* (2006.01)

(52) U.S. Cl.
  CPC .......... *C02F 1/5209* (2013.01); *C02F 1/5245* (2013.01); *C02F 1/5281* (2013.01); *D06F 33/62* (2020.02); *C02F 2103/002* (2013.01); *C02F 2209/001* (2013.01); *C02F 2307/12* (2013.01); *D06F 2103/18* (2020.02); *D06F 2103/22* (2020.02); *D06F 2105/06* (2020.02); *D06F 2105/34* (2020.02)

(56) References Cited

U.S. PATENT DOCUMENTS

| | | |
|---|---|---|
| 2017/0073878 A1 | 3/2017 | Xu et al. |
| 2017/0144904 A1 | 5/2017 | Shu et al. |
| 2018/0171529 A1 | 6/2018 | Xu et al. |
| 2018/0223468 A1 | 8/2018 | Xu et al. |

FOREIGN PATENT DOCUMENTS

| | | |
|---|---|---|
| CN | 105088642 | 11/2015 |
| CN | 105088698 | 11/2015 |
| CN | 106319880 | 1/2017 |
| CN | 106436183 | 2/2017 |
| CN | 106637810 | 5/2017 |
| CN | 106652095 | 10/2017 |
| EP | 3141651 | 3/2017 |
| EP | 3141652 A1 | 3/2017 |
| JP | 2002292193 | 8/2002 |
| WO | 0027759 A2 | 5/2000 |
| WO | WO2012084619 | 6/2012 |
| WO | 2015109911 A1 | 7/2015 |
| WO | WO2015168982 | 11/2015 |
| WO | WO2016192473 | 12/2016 |

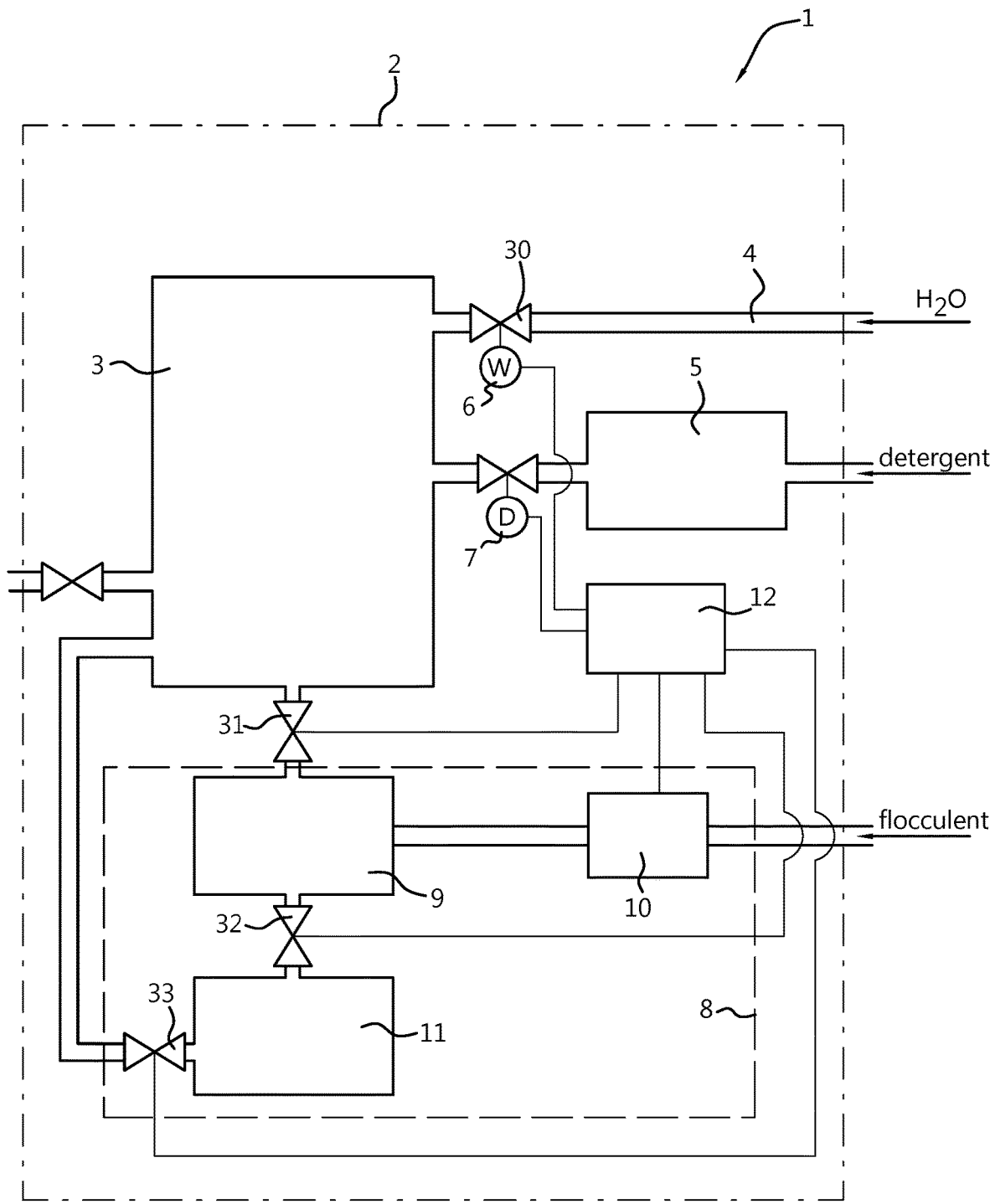

2

WASHING MACHINE COMPRISING A WATER PURIFICATION SYSTEM

RELATED APPLICATIONS

This application is a national phase filing under 35 USC 371 of International Application No. PCT/EP2018/061705, filed on May 7, 2018, which claims priority from European Patent Application No. 17176631.4 filed, Jun. 19, 2017, the contents of which are incorporated herein in their entirety for all purposes.

FIELD OF THE INVENTION

The present invention relates a program-controlled apparatus for washing items with water containing added detergent, wherein the apparatus has a water purification treatment function that purifies the water containing added detergent by means of flocculation. The invention further relates to a method of washing items in a program-controlled apparatus as described herein before.

BACKGROUND OF THE INVENTION

In several geographies water shortage is becoming a more and more acute problem and this is particularly true in developing countries.

Household cleaning processes like laundry, dishes etc., require large amounts of water. The waste water generated in-home from washing and rinsing laundry is generally referred to as greywater. It would be a great benefit if it were possible to reduce the amount of greywater that is produced by households. One possible way of achieving this is to treat the greywater so it can be reused, notably in cleaning processes. In order to reuse household grey water for cleaning processes it is essential to remove all the particulate matter and the detergents.

A commercially available front loading washing machine typically uses approximately 45-60 liters of water for a normal full wash cycle. A top loading washing machine typically requires about 180-240 liters of water. Depending on the number of rinse steps, 25-35% of this volume of water is required for the main wash, while 65-75% is used for the consecutive rinse cycles.

A commercially available dish washer typically uses approximately 11-12 liters of water for a normal full wash cycle, including rinsing.

WO 00/27759 discloses a process for treating water from a household washing process comprising separating from the items being washed the waste-water from the washing and/or rinsing step containing organic and/or inorganic soil and synthetic detergents, contacting the waste-water with a flocculant system comprising a primary flocculant selected from multivalent cations and polyethylene imines or mixtures thereof and a secondary flocculant selected from anionic and nonionic polyelectrolytes and mixtures thereof so that flocs are formed, separating the flocs out of the waste-water to produce purified water, and re-using the purified water.

WO 2012/084619 describes a process for continuous purification of wash water from a chamber using a sequential device comprising:
(a) a first dosing point, in fluid communication with
(b) a first mixing point; in fluid communication with
(c) a second dosing point, in fluid communication with
(d) a second mixing point; in fluid communication with
(e) a solid/liquid separator unit, in fluid communication with
(f) the chamber (a)
wherein the process comprises the steps of:
a. pumping the water from the chamber into the sequential device;
b. continuous, stepped or pulsed dosing of an electrolyte composition selected from aluminium and ferric salts to the wash water at the first dosing point;
c. continuous dosing of a polymer composition comprising neutral or anionically modified poly acryl amide polymer (MW>100 kD) to the wash water at the second dosing point;
characterised in that the dosing of the electrolyte and the polymer is controlled by the pH of the water between the first mixing point and the second dosing point, wherein electrolyte is dosed until the pH drops to between 6.8 and 8.2.

US 2016/0201249 describes a washing machine having a circulated water treatment function, comprising: a water containing drum, a washing structure disposed in the water containing drum and a circulated water treatment device disposed below the water containing drum, wherein the circulated water treatment device comprises a flocculation treatment unit and a filter unit; wherein the flocculation treatment unit comprises a flocculation container in communication with the water containing drum and a flocculant dispenser to which a flocculant is dispensed into the flocculation container, and the water containing drum drains water into the flocculation container for flocculation treatment; and wherein the filter unit comprises a filter container and a strainer disposed in the filter container, the filter container is in communication with the flocculation container and the water containing drum respectively, and the water after flocculation treatment in the flocculation container is filtered and then re-drained into the water containing drum for reuse.

WO 2015/109911 describes a flocculating washing machine control method and washing machine, said control method comprising: obtaining the intake water amount L of washing machine wash water; determining, according to said intake water amount L, at least one of: the amount A of added flocculant, the single flocculation intake water amount V, and the number of flocculation cycles N. The washing machine comprises: a washing drum, a clothes-washing structure arranged inside the washing drum, and a flocculation processing unit arranged on the washing drum exterior; after water is flocculated in the flocculation container, said flocculation processing unit cleaning the flocculated water, generating clean water; discharging the water back into the washing drum to be used once again by the washing machine for rinsing. By means of the described method and device, the number of washing machine flocculation cycles is accurately controlled, improving efficiency in flocculation self-cleaning of the wash water.

EP-A 3 141 651 describes a method for controlling water circulation and processing in a washing machine and a washing machine, the washing machine comprising a washing machine main body and a water circulation and processing system. The water circulation and processing system comprises a flocculation container for flocculating the drained water from the washing machine main body, the flocculation container being provided with a water level detection apparatus. After water is used by the washing machine for washing laundry, the water circulation and processing system subjects the water to flocculation and then circulates same for re-use, and, according to the amount of detergent dosed, the amount of water intake for washing, and the amount of water processed in each flocculation, calculates the dose of flocculant needed for the water to be processed by the flocculation process this time. The dose of flocculant can be precisely calculated by measuring and calculating the amount of water intake for washing and the amount of water to be processed for each flocculation so as to ensure flocculation effects.

EP-A 3 141 652 describes a washing machine and a control method therefor. The washing machine comprises a water-containing barrel, a flocculation container and a filtering container, and the water-containing barrel, the flocculation container, the filtering container and then the water-containing barrel are successively brought into communication in a loop; the flocculation container is provided with a stirring mechanism which stirs to accelerate the dissolution of flocculant and a washing mechanism for flushing and washing an inner wall of the flocculation container; a rotatable filtering mechanism and a filtering and self-washing mechanism using water intake current to spray and clean the filtering mechanism are provided in the filtering container. When the washing ends, water is discharged into the flocculation container, and after the flocculation processing, the water is discharged into the water-containing barrel of the washing machine for rinsing after being filtered by the filtering container, and the processing procedure is circulated until the rinsing is completed; during the last rinsing processing, the flocculation generated in the circulated water flocculation processing is controlled to be discharged and the rinsing is completed.

US 2017/0073878 describes a control method in a washing machine having a circulated water treatment function comprising, discharging water into a flocculation container after washing process ends, after a flocculation treatment, filtering water by a filtering container, and then discharging water into a water containing drum of the washing machine for rinsing, and circulating repeatedly foregoing processing procedure until the rinsing is completed, wherein, during last rinsing processing, flocculation generated in the flocculation treatment for circulated water is controlled to be discharged, and after the rinsing is completed, rinsing water is used to wash the flocculation container.

WO 2016/192473 describes a control method for a flocculation washing machine and a washing machine in which the control method is applied. The control method comprises: respectively detecting a washing water amount V and a detergent adding amount m in a washing procedure, to obtain a detergent concentration C=m/V; and determining, according to the detergent concentration C, a flocculation cycle number M of washing water and a flocculant adding amount Mn corresponding to each flocculation cycle.

SUMMARY OF THE INVENTION

The inventors have developed a program-controlled apparatus for washing items that is equipped with a water treatment system for purifying the wash liquor by removing detergent and suspended soil, which treatment system utilizes addition of flocculant, wherein the amount of flocculant that is added is controlled to minimize the total amount of flocculant used without compromising the efficacy of the purification treatment. The apparatus of the present invention is capable of producing rinsing water from wash liquor in adequate quantities and in a highly efficient manner, thereby obviating the need for external supply of rinsing water and minimizing the use of flocculant.

The apparatus of the present invention comprises:
an outer casing;
a washing chamber, which is arranged inside the casing;
an inlet connected to the washing chamber and arranged to introduce water into the washing chamber;
a detergent dispensing unit which is in fluid communication with the washing chamber and arranged to introduce detergent into the washing chamber;
a water dosing sensor arranged to generate a water amount signal that is indicative of the amount of water that is introduced into the washing chamber at the beginning of a wash cycle;
a detergent dosing sensor arranged to generate a detergent amount signal that is indicative of the amount of detergent that is introduced from the detergent dispensing unit into the washing chamber at the beginning of a wash cycle;
a water purification system which is arranged to receive a discrete quantity of wash liquor from the washing chamber, to purify this quantity of wash liquor and to return the purified liquor to the washing chamber in a purification cycle, said water purification system comprising:
  a flocculation chamber comprising an inlet and an outlet, the inlet of the flocculation chamber being in fluid communication with the washing chamber;
  a flocculant dispensing unit which is arranged to introduce flocculant into the flocculation chamber;
  a solid-liquid separation unit comprising an inlet that is in fluid communication with the outlet of the flocculation chamber and an outlet that is in fluid communication with the washing chamber;
a programmed control unit that (i) is arranged to receive the water amount signal from the water dosing sensor as an input parameter, (ii) is arranged to receive the detergent amount signal from the detergent dosing sensor as an input parameter, (iii) is arranged to control the number of purification cycles during a single wash cycle and (iv) is arranged to control the amount of flocculant that is introduced from the flocculant dispensing unit into the flocculation chamber during each purification cycle;
wherein the programmed control unit is arranged to control the amount of flocculant that is introduced from the flocculant dispensing unit into the flocculation chamber during each purification cycle in dependency of (a) the water amount signal received from the water dosing sensor, (b) the detergent amount signal received from the detergent dosing sensor and (c) the counted number of purification cycles; wherein the water purification system is arranged to receive a discrete quantity of wash liquor from the washing chamber that equals less than 90 wt. % of the total amount of wash liquor that is present in the washing chamber; and wherein the programmed control unit is arranged to let the apparatus carry out at least three successive purification cycles during one wash cycle.

The inventors have found that in a wash cycle that comprises multiple purification cycles in which the same discrete quantity of wash liquor is purified, the amount of flocculant required to adequately purify this quantity of wash liquor should decrease exponentially towards a certain minimum dosage with each purification cycle. Because the concentration of detergent in the wash liquor decreases with each purification cycle, the amount of flocculant used in the next purification cycle can be lowered. However, the inventors have found that the flocculant dosage employed during the purification cycles should not drop below a certain minimum dosage as otherwise inadequate purification is observed. Although the inventors do not wish to be bound by theory, it is believed that when the detergent concentration in the wash liquor is reduced to a certain critical concentration as a result of the purification treatment, detergent will be extracted from e.g. fabric. This sustained release of detergent from fabric or other articles makes it necessary to maintain a minimum dosage of flocculant dosage during the purification cycles.

The inventors have found that the amount of flocculant that is required for adequate purification in a particular purification cycle is largely determined by the following parameters:
- the amount of detergent added at the beginning of the wash cycle (A)
- the amount of water introduced at the beginning of the wash cycle (V)
- the flocculant/detergent ratio (w/w) needed to remove sufficient detergent (α)
- the number of purification cycles (i)
- the quantity of water that is withdrawn for a purification treatment ($v_i$)

If the quantity of water that is withdrawn for each purification treatment is constant and if all of the purified liquor is returned to the washing chamber, the amount of flocculant required for adequate purification in purification cycle i ($F_i$) in dependency of the aforementioned parameters can be described by the following formula:

$$F_i = [(1-(v/V))^{i-1}(A/V-X)+X]\alpha \cdot v$$

wherein:
i represents the purification cycle number;
$F_i$ represents the amount of flocculant that is introduced during purification cycle i;
V represents the amount of water introduced at the beginning of the wash cycle;
A represents the amount of detergent introduced at the beginning of the wash cycle;
v represents the quantity of water that is withdrawn for purification treatment;
α represents the flocculant/detergent ratio (w/w), needed to remove sufficient detergent, wherein flocculant/detergent ratio (w/w) is the ratio between the flocculant weight and the detergent weight;
X represents a constant.

The programmed control unit of the present apparatus utilizes the aforementioned equation to minimize the amount of flocculant that is used to adequately purify the wash liquor. This is done by calculating the amount of flocculant that is to be introduced from the flocculant dispensing unit into the flocculation chamber during each purification cycle on the basis of (a) the water amount signal received from the water dosing sensor, (b) the detergent amount signal received from the detergent dosing sensor and (c) the counted number of purification cycles, and by subsequently dosing the calculated amount of flocculant into the flocculation chamber.

BRIEF DESCRIPTION OF THE DRAWINGS

FIG. 1 shows a schematic drawing of a program-controlled apparatus for washing items with water containing added detergent, according to an embodiment of the present invention.

DETAILED DESCRIPTION OF THE INVENTION

Accordingly, with reference to the schematic drawing of FIG. 1, a first aspect of the invention relates to a program-controlled apparatus (1) for washing items with water containing added detergent, the apparatus (1) comprising:
an outer casing (2);
a washing chamber (3), which is arranged inside the casing;
an inlet (4) connected to the washing chamber (3) and arranged to introduce water into the washing chamber (3);
a detergent dispensing unit (5) which is in fluid communication with the washing chamber (3) and arranged to introduce detergent into the washing chamber (3);
a water dosing sensor (6) arranged to generate a water amount signal that is indicative of the amount of water that is introduced into the washing chamber (3) at the beginning of a wash cycle;
a detergent dosing sensor (7) arranged to generate a detergent amount signal that is indicative of the amount of detergent that is introduced from the detergent dispensing unit (5) into the washing chamber (3) at the beginning of a wash cycle;
a water purification system (8) which is arranged to receive a discrete quantity of wash liquor from the washing chamber (3), to purify the quantity of wash liquor and to return the purified liquor to the washing chamber (3) in a purification cycle, said water purification system (8) comprising:
a flocculation chamber (9) comprising an inlet and an outlet, the inlet of the flocculation chamber (9) being in fluid communication with the washing chamber (3);
a flocculant dispensing unit (10) which is arranged to introduce flocculant into the flocculation chamber (9);
a solid-liquid separation unit (11) comprising an inlet that is in fluid communication with the outlet of the flocculation chamber and an outlet that is in fluid communication with the washing chamber (3);
a programmed control unit (12) that (i) is arranged to receive the water amount signal from the water dosing sensor (6) as an input parameter, (ii) is arranged to receive the detergent amount signal from the detergent dosing sensor (7) as an input parameter, (iii) is arranged to control the number of purification cycles during a single wash cycle and (iv) is arranged to control the amount of flocculant that is introduced from the flocculant dispensing unit into the flocculation chamber (9) during each purification cycle;
wherein the programmed control unit (12) is arranged to control the amount of flocculant that is introduced from the flocculant dispensing unit (10) into the flocculation chamber (9) during each purification cycle in accordance with the following equation:

$$F_i = [(1-(v/V))^{i-1}(A/V-X)+X]\alpha \cdot v$$

wherein:
i represents the purification cycle number;
$F_i$ represents the amount of flocculant that is introduced during purification cycle i;
V represents the amount of water introduced at the beginning of the wash cycle;
A represents the amount of detergent introduced at the beginning of the wash cycle;
v represents the quantity of water that is withdrawn for purification treatment;
α represents the flocculant/detergent ratio (w/w) needed to remove sufficient detergent, wherein flocculant/detergent ratio (w/w) is the ratio between the flocculant weight and the detergent weight;

X represents a constant;

wherein the water purification system (8) is arranged to receive a discrete quantity of wash liquor from the washing chamber (3) that equals less than 90 wt. %) of the total amount of wash liquor that is present in the washing chamber (3); and wherein the programmed control unit (12) is arranged to let the apparatus (1) carry out at least three successive purification cycles during one wash cycle.

The term 'flocculation' as used herein refers to a process of contact and adhesion whereby the particles of a dispersion form larger-size clusters.

The term wt % refers to weight percentage.

The purification cycle number "i" in the above mentioned equation equals 1 for the first purification cycle, and it equals "n" for the $n^{th}$ purification cycle.

The constant X in the equation is indicative of the amount of detergent that is released from the washed items when the detergent concentration in the wash liquor is reduced during the purification cycles.

It should be understood that for a given wash cycle the parameter "v" in the aforementioned equation is a constant. Since for a given wash cycle also the parameters "V", "A" and "α" are constants, the changes in the calculated variable $F_i$ are determined solely by the parameter "i". In other words, during a wash cycle the amount of flocculant that is introduced into the flocculation chamber during each purification cycle is varied solely in dependency of parameter "i".

The ratio "v/V" in the above mentioned equation preferably is in the range of 0.1 to 0.80, more preferably in the range of 0.15 to 0.75 and most preferably in the range of 0.20 to 0.60.

In one preferred embodiment of the invention, the program-controlled apparatus (1) is an apparatus for washing laundry items, wherein the washing chamber (3) comprises a rotatable drum, which is arranged in an axially rotating manner inside the washing chamber (3) and is designed to receive laundry to be washed.

In an alternative preferred embodiment of the invention, the program-controlled apparatus (1) is an apparatus for dish washing, wherein the washing chamber (3) comprises one or more racks for supporting the dishes to be washed.

In another advantageous embodiment, the inlet (4) comprises a valve (30) arranged to regulate the amount of water that is introduced into the washing chamber (3). The amount of water that is introduced via inlet (4) into the washing chamber (3) may vary depending on the washing program that is selected by the user. Preferably, the valve (30) is operatively connected to the programmed control unit (12).

The amount of detergent that is dispensed by the detergent dispensing unit (5) into the washing chamber (3) is typically equal to the amount of detergent that is introduced by the consumer into the program-controlled apparatus before starting the wash cycle. In an alternative embodiment, the detergent dispensing unit (5) can hold an amount of detergent that is sufficient for several washes and the amount of detergent that is dispensed during a wash cycle is determined by the washing program that is selected by the user. In the latter case the detergent dispensing unit (5) is preferably operatively connected to the programmed control unit (12).

During a purification cycle, preferably only a fraction of the wash liquor is removed from the washing chamber (3) for purification as this ensures the most efficient purification of the wash liquor. Accordingly, the apparatus (1) is preferably arranged to remove 10-80 wt. %, preferably 15-75 wt. %, more preferably 20-60 wt. % of the wash liquor for purification from the washing chamber (3) during each of the multiple purification cycles.

According to a particularly preferred embodiment of the invention, the apparatus (1) is arranged to carry out 4 to 20 purification cycles, preferably 5 to 15 purification cycles, during a single wash cycle.

The inlet of the flocculation chamber (9) which is in fluid communication with the washing chamber (3) typically comprises a valve (31) arranged to regulate the amount of wash liquor for purification that is removed from the washing chamber. In a preferred embodiment, said valve (31) is operatively connected to the programmed control unit (12).

The flocculant dispensing unit (10) preferably comprises transportation means arranged to dose flocculant into the flocculation chamber, which transportation means are operatively connected to the programmed control unit (12). This transportation means is preferably selected from an auger, fluidizing fillers, centrifugal belt type, impeller type, gravity type, open mouth, drum and bulk box, positive displacement blower, single spout.

The outlet of the flocculation chamber (9) which is in fluid communication with the inlet of the solid-liquid separation unit (11) typically comprises a valve (32) arranged to regulate the flow of the flocculated wash liquor from the flocculation chamber to the solid-liquid separation unit (11). The valve (32) is preferably operatively connected to the programmed control unit (12).

The flocculation chamber (9) preferably comprises an agitator to enhance the rate of flocculation. Preferably, the agitator is a rotating stirring device.

The outlet of the solid-liquid separation unit (11) that is in fluid communication with the washing chamber (3) preferably comprises a valve (33) arranged to regulate the flow of the purified wash liquor from the solid-liquid separation unit (11) into the washing chamber (3). This outlet of the solid-liquid separation unit (11) preferably comprises a pump that is arranged to transfer the purified wash liquor from the solid-liquid separation unit (11) into the washing chamber (3).

The solid-liquid separation unit (11) is typically selected from a filtration unit, a decanter, a centrifuge, a hydrocyclone and a flotation unit. Most preferably, the solid-liquid separation unit (11) is a filtration unit.

The solid-liquid separation unit (11) preferably comprises a second outlet for the disposal of solid waste. Preferably, this second outlet is sealed by a removable closing device.

The programmed control unit (12) preferably is a microprocessor.

The programmed control unit (12) is operatively connected to the flocculant dispensing unit (10).

In a preferred embodiment, the programmed control unit (12) is also operatively connected to the valves (30), (31), (32) and (33). In accordance with this embodiment, the programmed control unit (12) controls the supply of water to the washing chamber (3); the release of washing liquor from the washing chamber (3) into the flocculation chamber (9); the dosing of flocculant from the flocculant dispensing unit (10) into the flocculation chamber (9); the transfer of flocculation dispersion from the flocculation chamber (9) to the solid-liquid separation unit (11); and the return of purified liquor from the solid-liquid separation unit (11) to the washing chamber (3).

The programmed control unit (12) is arranged to count the number of purification cycles during a single wash cycle, e.g. by counting the number of times that one of the valves (31), (32) and (33) is opened during a wash cycle or by counting the number of times that the flocculant dispensing unit (10) is operated during a wash cycle.

The programmed control unit (12) is arranged to let the apparatus (1) carry out at least three successive purification cycles during one wash cycle. In a particularly preferred embodiment of the invention, the programmed control unit (12) is programmed to control the total number of purification cycles i within a single wash cycle in accordance with the following equation:

$$i = a \cdot (v/V)^{-1.141}$$

wherein: $3 \le a \le 5$, preferably $3.1 \le a \le 4$;
with the proviso that if the calculated value for i is lower than 3, the programmed control unit (12) is programmed to apply 3 purification cycles.

The following table shows the values calculated for i as a function of a and v/V:

|     | a   |     |     |     |
| --- | --- | --- | --- | --- |
|     | 3.4 | 3.4 | 3.4 | 3.4 |
| v/V | 0.8 | 0.6 | 0.4 | 0.2 |
| i   | 4.4 | 6.1 | 9.7 | 21.3 |

A second aspect of the invention relates to a method of washing items in a program-controlled apparatus as described herein before, said method comprising the use of a detergent that contains at least 9 wt. % of surfactant and the use of a flocculant that contains a salt of aluminum and/or iron in combination with neutral or anionically modified polyacrylamide.

The detergent used in the present method preferably contains at least 5 wt. % anionic surfactant.

The salt of aluminium and/or iron in the flocculant is preferably a polymeric salt selected from polyaluminium flocculent, poly-iron flocculant and combinations thereof, said polymeric salt having a basicity in the range of 45% to 85%. More preferably the polymeric salt is a polyaluminium flocculent having a basicity in the range of 45% to 85%. Most preferably the polymeric salt is aluminium chlorohydrate having a basicity in the range of 70-95%.

The term "aluminium chlorohydrate" as used herein refers to compounds having the general formula $(Al_nCl_{(3n-m)}(OH)_m)$, wherein the basicity of said compounds is in the range of 70% to 95%. The term "basicity" as used herein refers to is defined by the equation: $100\% \cdot [OH]/(3 \cdot [Al])$.

The neutral or anionically modified polyacrylamide in the flocculent preferably has a molecular weight of more than 1,000 kDa. The modified polyacrylamide preferably is an anionic modified polyacrylamide.

The flocculent according to the invention typically further comprises an inert particulate filler, such as feldspar, silica, bentonite, calcite, diatomaceous earth and combinations thereof. The inert particulate filler preferably has a density of at least 1.5 kg/dm³, more preferably a density of 1.75-2.7 kg/dm³, most preferably a density of 2-2.5 kg/dm³.

The invention is further illustrated by the following non-limiting examples.

EXAMPLES

Example 1

The performance of a laundry washing machine according to the invention was tested as follows. The washing machine was filled with 8.5 L wash liquor. The wash liquor contained 1 g/l detergent (containing 14.4 wt. % anionic surfactant) and 0.1 g/l model soil.

During each purification cycle 5 L of wash liquor was treated in the purification system of the washing machine with a flocculant having the composition described in Table 1.

TABLE 1

|  | Wt. % |
| --- | --- |
| Aluminium chlorohydrate | 52 |
| Feldspar | 43 |
| Anionically modified polyacrylamide | 5 |

The residence time of the wash liquor in the flocculation chamber was 60 seconds (30 seconds stirring, 15 seconds pause; 15 seconds stirring).

The programmed control unit prompted the apparatus to carry out 7 purification cycles during which flocculant was introduced in the flocculation chamber by the flocculant dispensing unit in the dosages shown in Table 2. These dosages were calculated using the following parameter values in the equation $F_i = [(1-(v/V))^{i-1}(A/V-X)+X]\alpha \cdot v$:
V=8.5 L
A=8.5 g
v=5 L
α=0.466
X=0.27 g/L

TABLE 2

| Purification cycle | Flocculent dosage (in grams) |
| --- | --- |
| 1 | 2.33 |
| 2 | 1.33 |
| 3 | 0.92 |
| 4 | 0.75 |
| 5 | 0.68 |
| 6 | 0.65 |
| 7 | 0.64 |

The turbidity of the wash liquor in the washing tub was measured before the first purification cycle and after each purification cycle. The results are shown in Table 3.

TABLE 3

| Purification cycle | Turbidity (NTU) |
| --- | --- |
| 0 | 148 |
| 1 | 72.4 |
| 2 | 24.4 |
| 3 | 9.8 |
| 4 | 5.4 |
| 5 | 4.1 |
| 6 | 3.3 |
| 7 | 2.8 |

The invention claimed is:
1. A program-controlled washing apparatus comprising:
an outer casing;
a washing chamber inside the casing;
an inlet connected to the washing chamber and configured to introduce water into the washing chamber;
a detergent dispensing unit in fluid communication with the washing chamber and configured to introduce detergent into the washing chamber;
a water dosing sensor configured to generate a water amount signal that is indicative of the amount of water that is introduced into the washing chamber at the beginning of a wash cycle;

a detergent dosing sensor configured to generate a detergent amount signal that is indicative of the amount of detergent that is introduced from the detergent dispensing unit into the washing chamber at the beginning of a wash cycle;

a water purification system configured to receive a quantity of wash liquor from the washing chamber, configured to purify the quantity of wash liquor and to return the purified liquor to the washing chamber in a purification cycle, wherein the water purification system comprises:
- a flocculation chamber comprising an inlet and an outlet, the inlet of the flocculation chamber in fluid communication with the washing chamber;
- a flocculant dispensing unit configured to introduce flocculant into the flocculation chamber;
- a solid-liquid separation unit comprising an inlet in fluid communication with the outlet of the flocculation chamber and an outlet in fluid communication with the washing chamber;

a programmed control unit configured to
(i) receive the water amount signal from the water dosing sensor as an input parameter,
(ii) receive the detergent amount signal from the detergent dosing sensor as an input parameter,
(iii) control the number of purification cycles during a single wash cycle and
(iv) control the amount of flocculant that is introduced from the flocculant dispensing unit into the flocculation chamber during each purification cycle;
wherein the programmed control unit configured to control the amount of flocculant that is introduced from the flocculant dispensing unit into the flocculation chamber during each purification cycle in accordance with the following equation:

$$F_i = [(1-(v/V))^{i-1}(A/V-X)+X]\alpha \cdot v$$

wherein:
i represents the purification cycle number;
$F_i$ represents the amount of flocculant that is introduced during purification cycle i;
V represents the amount of water introduced at the beginning of the wash cycle;
A represents the amount of detergent introduced at the beginning of the wash cycle;
v represents the quantity of water that is withdrawn for purification treatment;

α represents the flocculant/detergent ratio (w/w), needed to remove sufficient detergent, wherein the flocculant/detergent ratio (w/w) is the ratio between the flocculant weight and the detergent weight;
X represents a constant;
wherein the water purification system configured to receive a discrete quantity of wash liquor from the washing chamber that equals less than 90 wt. % of the total amount of wash liquor that is present in the washing chamber; and
wherein the programmed control unit configured to allow apparatus to perform at least three successive purification cycles during one wash cycle.

2. The apparatus according to claim 1,
wherein the programmed control unit configured to control the total number of purification cycles, i, within a single wash cycle in accordance with the following equation:

$$i = a \cdot (v/V)^{-1.141}$$

wherein 3≤a≤5
wherein if the calculated value for i is lower than 3, the programmed control unit configured to apply 3 purification cycles.

3. The apparatus according to claim 1, wherein the apparatus configured to remove 10-80% of the wash liquor for purification from the washing chamber during each of the multiple purification cycles.

4. The apparatus according to claim 1, wherein the apparatus configured to perform 4 to 20 purification cycles during a single wash cycle.

5. The apparatus according to claim 1, wherein the solid-liquid separation unit selected from the group consisting of a filtration unit, a decanter, a centrifuge, a hydrocyclone or a flotation unit.

6. The apparatus according to claim 1, wherein the flocculation chamber comprises an agitator.

7. The apparatus according to claim 1, wherein the washing chamber comprises a rotatable drum which is arranged in axially rotating manner inside the washing chamber and configured to receive laundry to be washed.

8. A method of washing items in an apparatus according to claim 1, the method further comprising using the detergent that contains at least 9 wt. % of surfactant and using a flocculant that contains a aluminum salt, iron salt, or combination thereof,
wherein the aluminum salt, iron salt, or combination thereof is in combination with neutral or anionically modified polyacrylamide.

* * * * *